United States Patent
Nikoghossian

[15] 3,672,058
[45] June 27, 1972

[54] DENTAL IMPLANT

[72] Inventor: Albert-Jean Nikoghossian, 333n Chemin de la Madrague-Ville, 13 Marseille, 15, France

[22] Filed: April 16, 1970

[21] Appl. No.: 29,072

[30] Foreign Application Priority Data

April 18, 1969 France..................................6911366
Feb. 6, 1970 France..................................7004374

[52] U.S. Cl. ..........................................................32/10 A
[51] Int. Cl.......................................................A61c 13/22
[58] Field of Search ..............................................32/10 A, 5

[56] References Cited

UNITED STATES PATENTS 403,428    5/1889    Hansen......................................32/13

3,466,748    9/1969    Christenson..............................32/10

OTHER PUBLICATIONS

Implant Research Corporation, Box 123, Pennsauken, New Jersey 08110, Sept. 19, 1968, 2 pages.

*Primary Examiner*—Robert Peshock
*Attorney*—Ward, McElhannon, Brooks & Fitzpatrick

[57] ABSTRACT

Endo-osseous dental implant composed, in a single piece, of a stump intended to support a dental prosthesis and a self-drilling conical screw extended by a long sharp point and process of putting such an implant in position by screwing in the walls of the alveolar recess of a freshly extracted tooth root after it has been filled with autopolymerizable resin.

5 Claims, 5 Drawing Figures

DENTAL IMPLANT

The object of the present invention is endo-osseous dental implants and the method of inserting them.

There are already known several types of dental implants intended to fasten a dental prosthesis to the jawbone. Some of these implants have a cylindrical or conical threaded rod which is screwed into the jawbone. This rod is integral with a head on which the prosthesis is fastened. There are implants of this type which are screwed in to the alveolus which served as housing for a tooth root after extraction of the latter and after the dentist has tapped a thread in the wall of the alveolus.

The drawback of these implants resides in the fact that they have poor resistance to the mechanical forces which they must withstand while chewing, and particularly tangential forces which tend to pivot the implant in the alveolus. They also poorly withstand phenomena of rejection by the organism.

One of the objects of the present invention is a self-drilling implant which is screwed into the wall of the alveolus which served as housing for a freshly extracted tooth root, this technique having the advantage over implants of the needle type or of the screw type which are fastened in holes drilled in the jawbone of reducing the injury to the bone tissues of the patient to a minimum.

Another object of the invention is an implant which withstands rejection phenomena and mechanical forces due to a sharp point which is extended and penetrates deep into the jawbone in the region located beyond the end of the roots, known as the apical area.

Another object of the invention is an implant which can serve as support for an artificial tooth or else as bridge post.

Another object of the invention is a process for inserting the implant which consists in filling the alveolar recess with polymerizable resin before the insertion of the implant. This resin increases the resistance to rejection of the implant and avoids deformations of the jawbone.

A dental implant in accordance with the invention is composed, in a single piece, of a head intended to support a prosthesis and of a self-drilling conical threaded rod intended to be screwed into the bone wall of the alveolar recess of the root of a freshly extracted tooth, and the said threaded rod is extended by a sharp point intended to penetrate deep into the apical area of the jawbone.

In accordance with one embodiment of the invention, the implant has at least one groove, extending along a generatrix of the threaded rod, across the threads.

In accordance with another embodiment of the invention, the head has a cross-section less than that of the base of the threaded rod so that a shoulder, serving as bearing surface for the prosthesis, surrounds the base of the head.

A single implant can support a single artificial tooth or furthermore one or two teeth located on opposite sides of the implant. In the latter case, in accordance with the invention, an auxiliary support consisting of a sleeve bearing one or two lateral arms, each of which is terminated by a head and on which the lateral prostheses are fastened, is fitted over the head of the implant before the central prosthesis is put in place.

The accompanying drawings show preferred embodiments of the invention.

Figure 1:
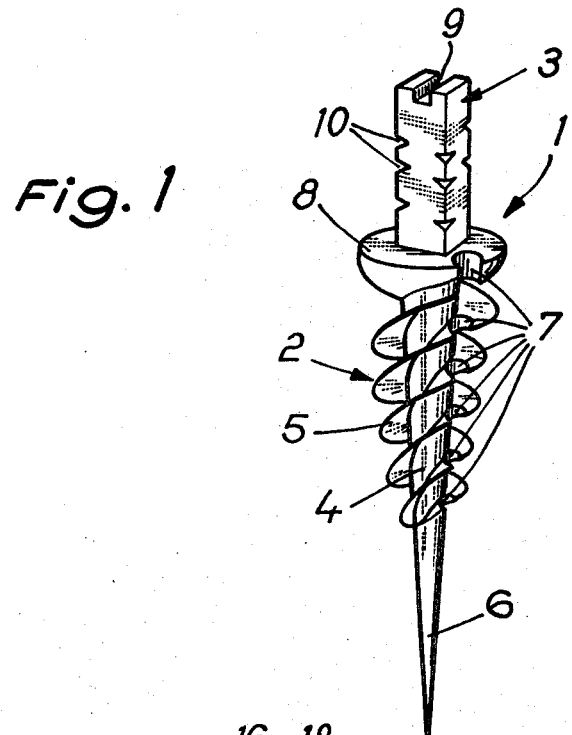
FIG. 1 is a perspective view of an implant in accordance with the invention.

FIG. 1 shows an implant 1, of a single piece, consisting of two main portions, namely a threaded portion 2 intended to be screwed into the jawbone and a prosthesis support or head 3. The threaded portion 2 is composed of a a conical solid rod 4 the apex of which is directed downward. Over a portion of its height this rod bears a protruding helical threading 5. The threads have a cutting edge, the pitch of the helix is relatively large and the outside diameters of the threads decrease from the base towards the apex so that this part constitutes a self-drilling screw. Beyond the threaded portion, the solid body 4 is extended by a point 6. The angle at the apex of the cone is very small, of the order of 10°, and the point 6 is therefore very sharp. By way of example, the height of the threaded portion is about 10 mm and the height of the point 6 is between 5 mm and 10 mm, depending on the type of tooth. A longitudinal groove 7 is cut along a generatrix of the cone through the threads 5. A second groove 7', not visible in the drawing, can be cut along the diametrically opposite generatrix. These grooves discharge at the upper part of the screw, forming two diametrically opposite notches. A tool with handle can be engaged in these two notches in order to unscrew the screw in case the head breaks.

The head 3 has a square or polygonal cross-section. The side of this cross-section is less than the diameter of the base of the screw. The base of the screw forms a shoulder 8 on which the prosthesis rests.

The square shape of the head makes it possible to turn it with a wrench or pliers. The upper face has a notch 9 which permits turning the head with a screwdriver. Notches 10 are cut on the faces of the head to improve the adherence of the prosthesis.

Figure 2:
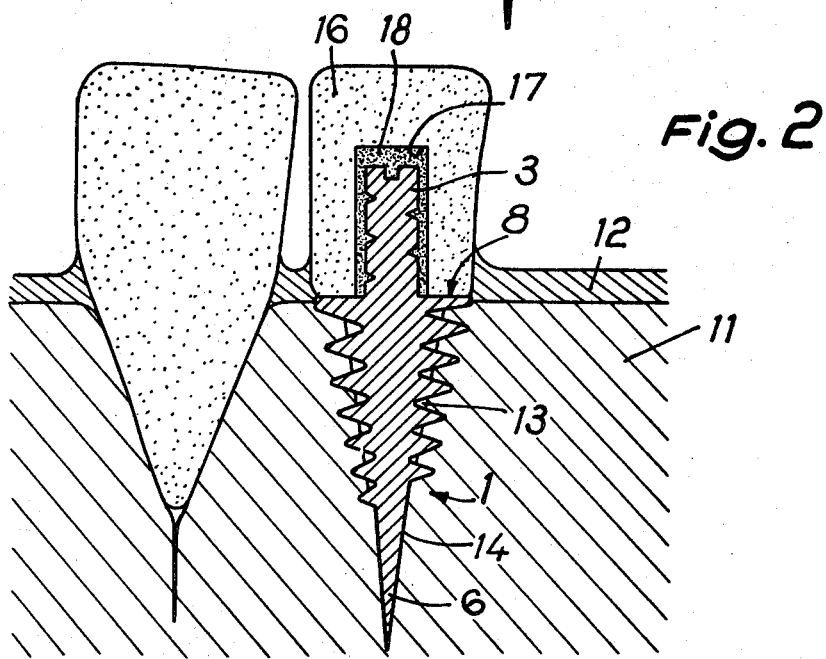
FIG. 2 is a longitudinal cross-section through the maxilla.

FIG. 2 shows in longitudinal section a tooth in position and a prosthesis mounted on an implant 1 in accordance with the invention. 11 is the jawbone, 12 the gingival mucous membrane, 13 is the alveolar cavity which served as housing for the roots of the tooth before the extraction of the latter. This alveolar cavity is extended downward by a small channel known as the apical channel through which the nerves and vessels of the tooth pass. The area 14 surrounding this channel is the apical area.

In this figure one can note the position occupied by the implant. The point 6 penetrates deep into the apical area. The threads of the self-tapping screw penetrate into the side walls of the alveolar cavity. The shoulder 8 extends slightly beyond the level of the jawbone 11. The prosthesis 16 has an internal cavity 17 in which the head 3 is housed. The prosthesis is sealed on the head for instance, by a cement 18. The prosthesis 16 rests on a shoulder 8 and at the end of a few days the mucous membrane 12 has reformed around the base of the prosthesis.

Figure 3:
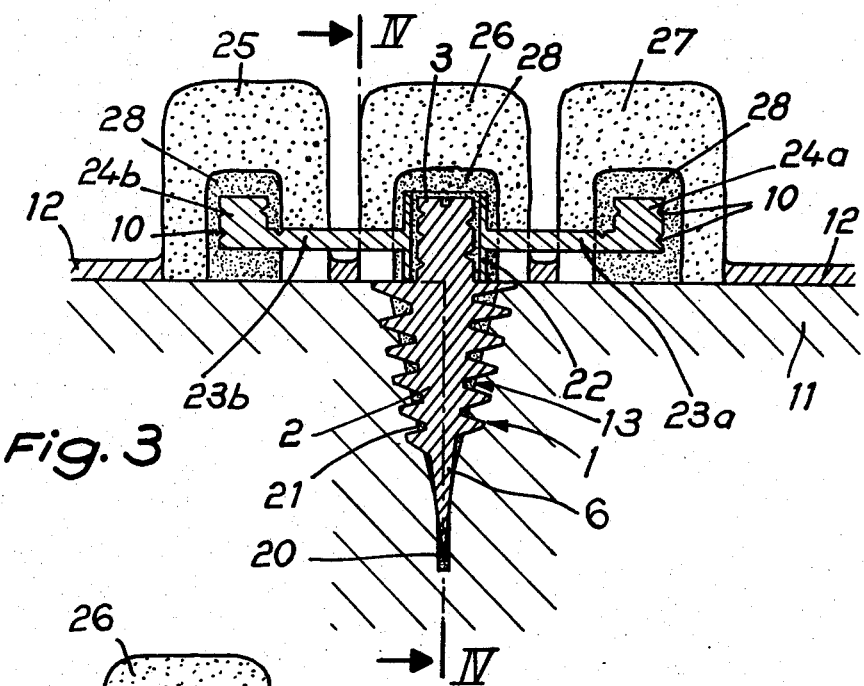
FIG. 3 shows in cross-section a bridge of three teeth mounted on an implant in accordance with the invention.

FIG. 3 shows in longitudinal section the jawbone 11, the gingival mucous membrane 12 and an alveolar cavity 13 in which there is placed an implant 1 in accordance with the invention composed of a self-drilling screw 2 extended by a point 6 and with a head 3 bearing notches 10. After extraction of a tooth, if there is concerned a molar having several roots, the dentist removes with a burr the interalveolar partitions which separate the housings of these roots. He then drills with a bit a pilot hole 20 in the apical area, the diameter of which hole is less than the largest diameter of the point 6 and the length of which is substantially equal to that of the said point.

The implants are provided in the form of blanks in accordance with various standard dimensions and the dentist adjusts the dimensions of the implant by grinding. The dentist pours a self-polymerizable resin 21 into the pilot hole 20 and the alveolar cavity 13. Before the resin has hardened, he screws the implant 1 into the cavity.

The longitudinal grooves shown at 7 in FIG. 1 permit the excess resin to escape. Once the implant has been screwed, these grooves are located on the sides of the alveolar cavity located towards the inside of the mouth and opposite same. They serve to introduce into the alveolus an additional quantity of resin to complete the filling.

The threads of the screw 2 penetrate into the spongy bone walls of the alveolar cavity 13.

FIG. 3 shows the case of an implant 1 which serves as central post for a bridge consisting of three artificial teeth. Once the implant 1 is in place, the dentist places over the head 3 a sleeve 22 which bears two lateral arms 23a and 23b. Each of these arms bears an auxiliary head 24a and 24b respectively. The assembly consisting of the sleeve 22, the arms 23a and 23b and the heads 24a and 24b forms a single piece, shown in perspective in FIG. 5 and referred to as the auxiliary support.

As a variant, in the case of a two-tooth bridge, one of the arms 23 and the corresponding head are eliminated.

Figure 5:
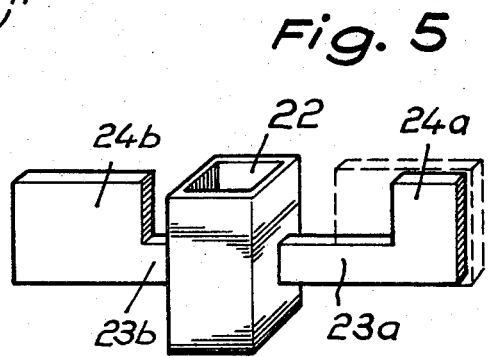
FIG. 5 is a perspective view of the auxiliary heads intended to be fitted on an implant in accordance with the invention.

FIG. 5 shows that the arms 23 and the heads 24 are formed, for instance, of plates of lesser thickness than the thickness of the sleeve 22. The left side of the figure shows the shape of the blanks which are supplied to the dentist.

The righthand portion of FIG. 5 shows, in dotted lines, the contour of the blank and in solid line the form which is given it by the dentist after having adjusted it by grinding.

After the auxiliary bridge support has been fitted on the head 3, the dentist puts the prostheses 25, 26 and 27 in position on the three heads and seals them by means of a cement 28 which fills the central cavities of these prostheses.

Figure 4:
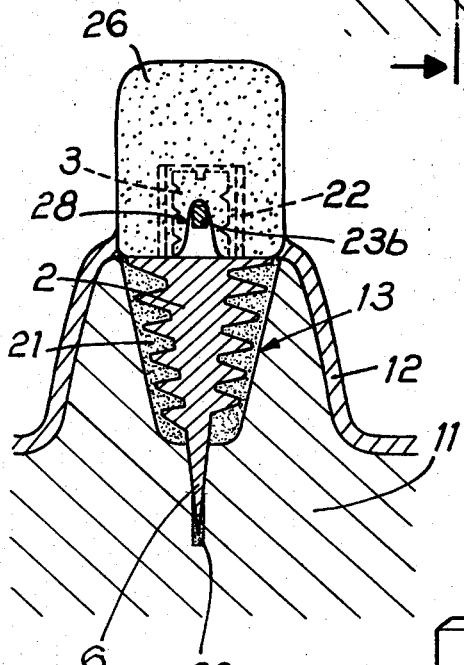
FIG. 4 is a view along the line IV—IV of FIG. 3.

FIG. 4 is a section along the line IV—IV of FIG. 3, that is to say, a cross-section through the jawbone 11 on which the same parts are represented by the same reference numbers.

The width of the alveolus 13 is larger in this direction and the threads of the screw 2 do not penetrate into the bone wall. The prosthesis 26 has a notch 28 for the passage of the arm 23b of the auxiliary bridge support.

The sharp point which forms the extension of the implant and which penetrates into the apical area imparts the implant sufficient resistance so that it can serve as bridge post.

The filling of the alveolar cavity with resin contributes to improving the anchoring of the implant. It also fills the empty space between the implant and the wall of the alveolus, which avoids the introduction of foreign bodies into this empty space and which maintains the walls of the alveolus and avoids subsequent deformations of the jawbone.

The sharp point and the polymerizable resin replace the action of the interalveolar ligaments which connect the roots of the teeth to the walls of the alveoli. Experience shows that the existing implants which are screwed into the bone wall of the alveoli formed of spongy bones do not have sufficient resistance and are rejected at the end of a few months, while the implant in accordance with the invention is not rejected due to the sharp point and due to the technique of fastening by a polymerizable resin.

I claim:

1. Endo-osseous dental implant for anchoring a dental prothesis in a jawbone, comprising an elongated conical shaft carrying, on a part of its length, a self-drilling conical screw thread for screwing into the walls of the alveolar recess remaining in the jawbone upon extraction of a tooth, said shaft having, at one end thereof, a smooth sharp point extending beyond said conical screw for penetrating deep into the apical area of the jawbone, the length of said point being at least a half of the length of said screw, said shaft having at the other end thereof, a head for securing a dental prothesis, said head having a cross-section smaller than that of the base of said conical screw to form a shoulder serving as a resting surface for said dental prothesis, and at least one longitudinally extending groove cut along a generatrix of said screw threads.

2. An implant according to claim 1 wherein said point is conical and extends from the generatrix of said conical shaft through the thread.

3. An implant according to claim 2 wherein the angle of the apex of said conical point is less than 10°.

4. A dental implant for supporting a plurality of artificial teeth comprising at least a polygonal head and an auxiliary support, said head having an elongated conical shaft, carrying on a part of its length, a self-tapping conical screw thread for screwing into the walls of the alveolar recess remaining upon extraction of a tooth, said shaft having, at one end thereof, a sharp point extending below said conical screw for penetrating deep into the apical area of the jawbone, the length of said point being at least a half of the length of said screw, and said shaft having at the other end thereof said polygonal head for securing both an artificial tooth and said auxiliary support, said support comprising a sleeve which fits over said head and which carries at least one lateral arm, the end of said arm being provided with a second head for securing an artificial tooth.

5. A dental implant according to claim 4 wherein said auxiliary support is formed of a blank comprising a sleeve carrying at least one lateral plate which is adjusted by the dental practitioner for forming said lateral arm and said second head.

* * * * *